(12) United States Patent
Kurjanowicz et al.

(10) Patent No.: US 10,339,502 B2
(45) Date of Patent: Jul. 2, 2019

(54) SKILL ANALYZER

(71) Applicant: ADP, LLC, Roseland, NJ (US)

(72) Inventors: Agatha Kurjanowicz, New York, NY (US); Dominic Gadoury, New York, NY (US)

(73) Assignee: ADP, LLC, Roseland, NJ (US)

( * ) Notice: Subject to any disclaimer, the term of this patent is extended or adjusted under 35 U.S.C. 154(b) by 1056 days.

(21) Appl. No.: 14/708,816

(22) Filed: May 11, 2015

(65) Prior Publication Data

US 2016/0292639 A1 Oct. 6, 2016

Related U.S. Application Data

(63) Continuation-in-part of application No. 14/679,231, filed on Apr. 6, 2015.

(51) Int. Cl.
*G06Q 10/00* (2012.01)
*G06Q 10/10* (2012.01)
*G06Q 10/06* (2012.01)
*G06F 16/28* (2019.01)

(52) U.S. Cl.
CPC ......... *G06Q 10/105* (2013.01); *G06F 16/287* (2019.01); *G06Q 10/063* (2013.01)

(58) Field of Classification Search
CPC ......... G06Q 10/063; G06Q 10/063112; G06Q 10/105; G06F 16/287
See application file for complete search history.

(56) References Cited

U.S. PATENT DOCUMENTS

| | | |
|---|---|---|
| 6,434,568 B1 | 8/2002 | Bowman-Amuah |
| 6,477,580 B1 | 11/2002 | Bowman-Amuah |
| 6,519,571 B1 | 2/2003 | Guheen et al. |
| 6,523,026 B1 | 2/2003 | Gillis |
| 7,523,126 B2 | 4/2009 | Rivette et al. |
| 8,032,404 B2 | 10/2011 | Lee et al. |
| 8,473,354 B2 | 6/2013 | Psota et al. |
| 2003/0177027 A1 | 9/2003 | DiMarco |
| 2005/0096950 A1 | 5/2005 | Caplan et al. |
| 2005/0188311 A1 | 8/2005 | Diesel et al. |

(Continued)

FOREIGN PATENT DOCUMENTS

| | | |
|---|---|---|
| WO | 0075849 A2 | 12/2000 |
| WO | 0163517 A1 | 8/2001 |

OTHER PUBLICATIONS

De Lange, G. (2000). The Identification of the Most Important Non-technical Skills Required by Entry Level Engineering Students When They Assume Employment. Journal of Cooperative Education, 35(2/3), 21-32 (Year: 2000).*

(Continued)

*Primary Examiner* — William S Brockington, III
(74) *Attorney, Agent, or Firm* — Yee & Associates, P.C.

(57) ABSTRACT

A method, computer system, and computer program product for analyzing skills for an organization. A computer system identifies a cluster of the skills from a graph of people in the organization. The graph of the people includes nodes for the people, connectors indicating relationships between the people, and information about the skills for the people. The computer system analyzes the cluster of the skills to form an analysis, enabling performing an operation for the organization based on the analysis of the cluster of the skills identified.

21 Claims, 13 Drawing Sheets

(56) References Cited

U.S. PATENT DOCUMENTS

| | | | |
|---|---|---|---|
| 2008/0270363 A1 | 10/2008 | Hunt et al. | |
| 2008/0288587 A1* | 11/2008 | Bahrs | G06Q 10/00 709/204 |
| 2009/0043797 A1 | 2/2009 | Dorie et al. | |
| 2009/0112704 A1 | 4/2009 | Branca | |
| 2010/0131455 A1 | 5/2010 | Logan et al. | |
| 2012/0197809 A1* | 8/2012 | Earl | G06Q 10/103 705/301 |
| 2013/0013996 A1 | 1/2013 | Wu | |
| 2013/0124474 A1* | 5/2013 | Anderson | G06F 17/30286 707/634 |
| 2013/0187926 A1 | 7/2013 | Silverstein et al. | |
| 2013/0198122 A1* | 8/2013 | Baughman | G06Q 10/06 706/45 |
| 2013/0318180 A1* | 11/2013 | Amin | H04L 65/403 709/206 |
| 2014/0279629 A1 | 9/2014 | McConnell | |
| 2014/0358607 A1* | 12/2014 | Gupta | G06Q 10/063112 705/7.14 |
| 2014/0365531 A1* | 12/2014 | Soundararajan | G06F 17/30587 707/798 |
| 2015/0088567 A1* | 3/2015 | Lambroschini | G06Q 10/06311 705/7.14 |
| 2015/0317376 A1* | 11/2015 | Bauer | G06F 17/30958 707/737 |

OTHER PUBLICATIONS

Office Action, dated Mar. 8, 2018, regarding U.S. Appl. No. 14/679,231, 14 pages.
Final Office Action, dated Jul. 3, 2018, regarding U.S. Appl. No. 14/679,231, 12 pages.

* cited by examiner

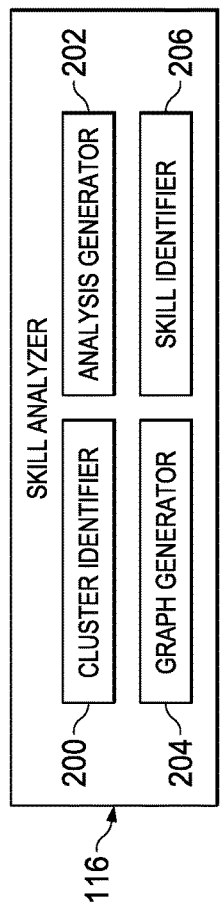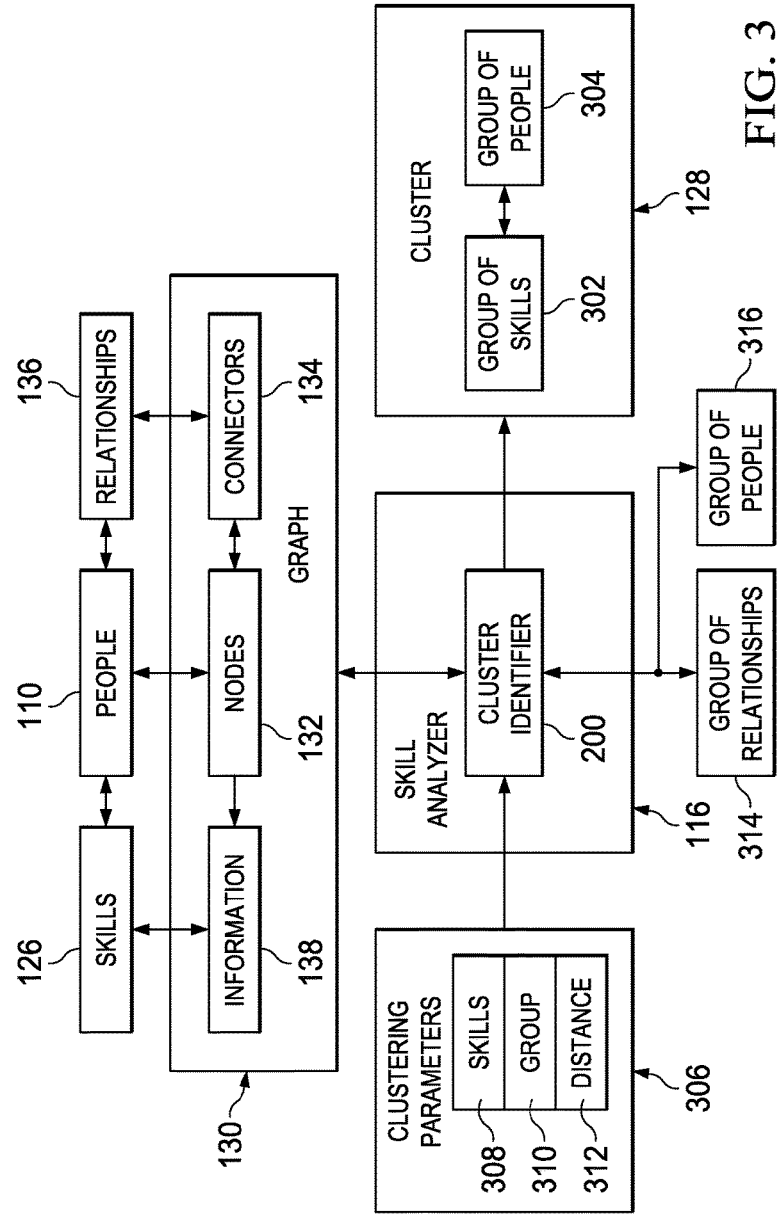

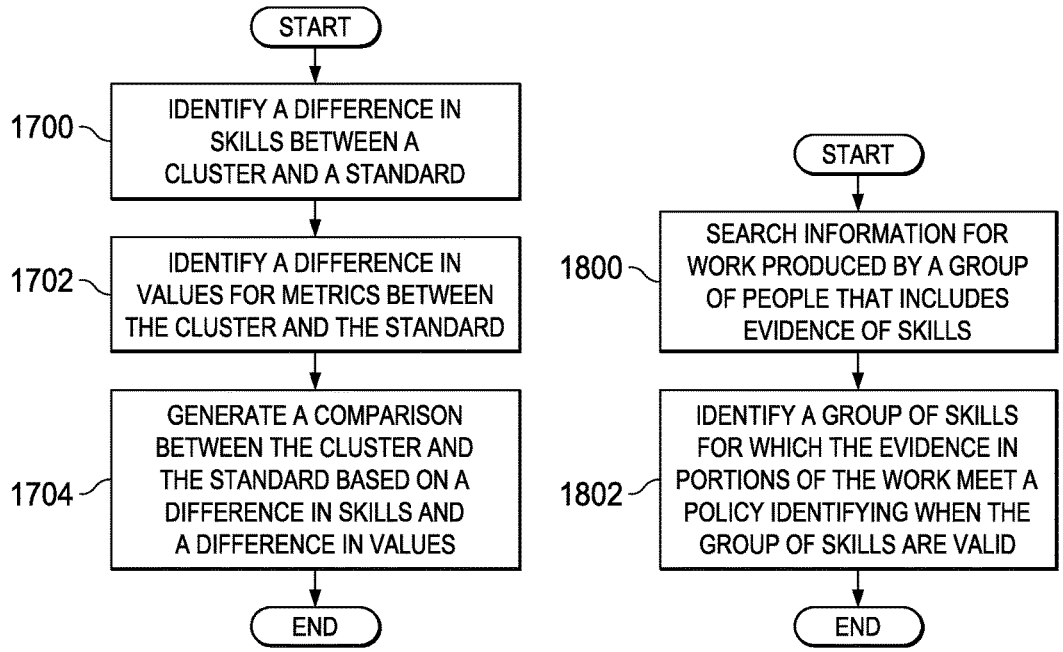
FIG. 17
FIG. 18
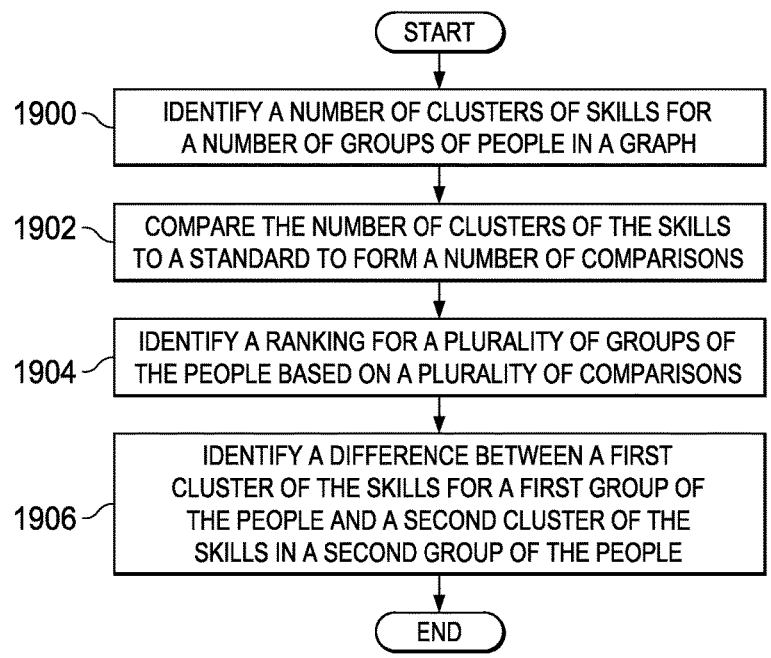
FIG. 19

SKILL ANALYZER

CROSS-REFERENCE TO RELATED APPLICATION

This application is a Continuation-in-Part of U.S. patent application Ser. No. 14/679,231, filed Apr. 6, 2015, entitled "Skill Identification System," which is incorporated herein by reference.

BACKGROUND INFORMATION

1. Field

The present disclosure relates generally to an improved computer system and, in particular, to a method and apparatus for more efficiently analyzing information in a computer system. Still more particularly, the present disclosure relates to a method and apparatus for more efficiently analyzing information about skills for people in a computer system.

2. Background

Information systems are used for many different purposes. For example, an information system may be used to process payroll or generate paychecks for employees in an organization. Additionally, an information system also may be used by a human resources department to maintain benefits and other records about employees. For example, a human resources department may manage health insurance, wellness plans, and other programs and organizations using an employee information system.

As yet another example, an information system may be used to determine when to hire new employees, assign employees to projects, perform reviews for employees, and other suitable operations for the organization. As another example, a research department in the organization may use an information system to store and analyze information to research new products, perform reviews of employees, hire new employees, analyze products, or for other suitable operations.

Currently used information systems include databases. These databases store information about the organization. For example, these databases store information about employees, products, research, product analysis, business plans, and other information about the organization.

These databases in the currently used information systems may not include all of the information needed for analysis to identify operations to perform for an organization. As a result, an operation that is selected for an operation may not be the correct one.

For example, in forming a team for a project, an analyst may identify previous projects of the same type that were performed successfully. For example, for a marketing project for a new product, the analyst may identify other marketing projects for similar products that resulted in successful sales of the product. The analyst may identify people who were involved and, in particular, identify the skills of those people, actions taken to make the project successful, or other information.

Identifying the skills that contributed to the successful marketing of the new product may be more difficult than desired. With the information in databases of currently used information systems, identification of the skills of the people involved, actions performed that led to the success of the projects, or both may be more difficult than desired.

Obtaining this type information may require more time and expense when data mining these databases than desired. In some cases, the information about the skills involved or actions that led to the success of the project may not be available in the information in the database.

For example, the analyst may send out surveys that ask people in the organization about the information needed. The surveys, however, are often lengthy, time-consuming, and expensive. As a result, the analyst may not often receive responses or may receive incomplete responses to surveys.

Therefore, it would be desirable to have a method and apparatus that take into account at least some of the issues discussed above, as well as other possible issues. For example, it would be desirable to have a method and apparatus that overcome a technical problem of insufficient information about the skills of people being present in information systems.

SUMMARY

An illustrative embodiment of the present disclosure provides a method for analyzing skills for an organization. A computer system identifies a cluster of the skills from a graph of people in the organization. The graph of the people includes nodes for the people, connectors indicating relationships between the people, and information about the skills for the people. The computer system analyzes the cluster of the skills to form an analysis, enabling performing an operation for the organization based on the analysis of the cluster of the skills identified.

Another illustrative embodiment of the present disclosure provides a computer system comprising a skill analyzer. The skill analyzer identifies a cluster of skills from a graph of people in an organization. The graph of the people includes nodes for the people, connectors indicating relationships between the people, and information about the skills for the people. The skill analyzer analyzes the cluster of the skills to form an analysis, enabling performing an operation for the organization based on the analysis of the cluster of the skills identified.

Yet another illustrative embodiment of the present disclosure provides a computer program product for analyzing skills in an organization. The computer program product comprises a computer readable storage media, and first program code and second program code stored on the computer readable storage media. The first program code identifies a cluster of the skills from a graph of the people in the organization. The graph of the people includes nodes for the people, connectors indicating relationships between the people, and information about the skills for the people. The second program code analyzes the cluster of the skills to form an analysis, enabling performing an operation for the organization based on the analysis of the cluster of the skills identified.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of a skill analyzer in accordance with an illustrative embodiment;

FIG. 3 is an illustration of a block diagram of data flow for identifying a cluster of skills in accordance with an illustrative embodiment;

FIG. 17 is an illustration of a flowchart of a process for generating a comparison between a cluster of skills and a standard in accordance with an illustrative embodiment;

FIG. 18 is an illustration of a flowchart of a process for identifying skills in accordance with an illustrative embodiment;

FIG. 19 is an illustration of a flowchart of a process for analyzing skills for an organization in accordance with an illustrative embodiment.

DETAILED DESCRIPTION

The illustrative embodiments recognize and take into account one or more different considerations. For example, the illustrative embodiments recognize and take into account that current solutions for identifying information needed to perform operations in the organization may not be sufficient.

Further, the illustrative embodiments recognize and take into account that the use of surveys may not provide the information desired. The illustrative embodiments also recognize and take into account that surveys are often subjective and may not provide a desired level of accuracy. For example, a survey may ask about skills of people in the team assigned to the project. The person answering the survey may not know all of the skills of the people on the team. Additionally, the person answering the survey also may not know which skills may or may not have contributed to the success of the project.

Thus, the illustrative embodiments provide a method and apparatus for analyzing skills for an organization. A cluster of the skills is identified from a graph of people in an organization. The graph of the people includes nodes for the people, connectors indicating relationships between the people, and information about the skills for the people. The cluster is analyzed to form an analysis. For example, the analysis may include comparing the cluster to a standard for the organization to form a comparison and enabling performing an operation for the organization based on the comparison cluster of skills identified to the standard. This comparison may be used to perform an operation for the organization.

Figure 1:
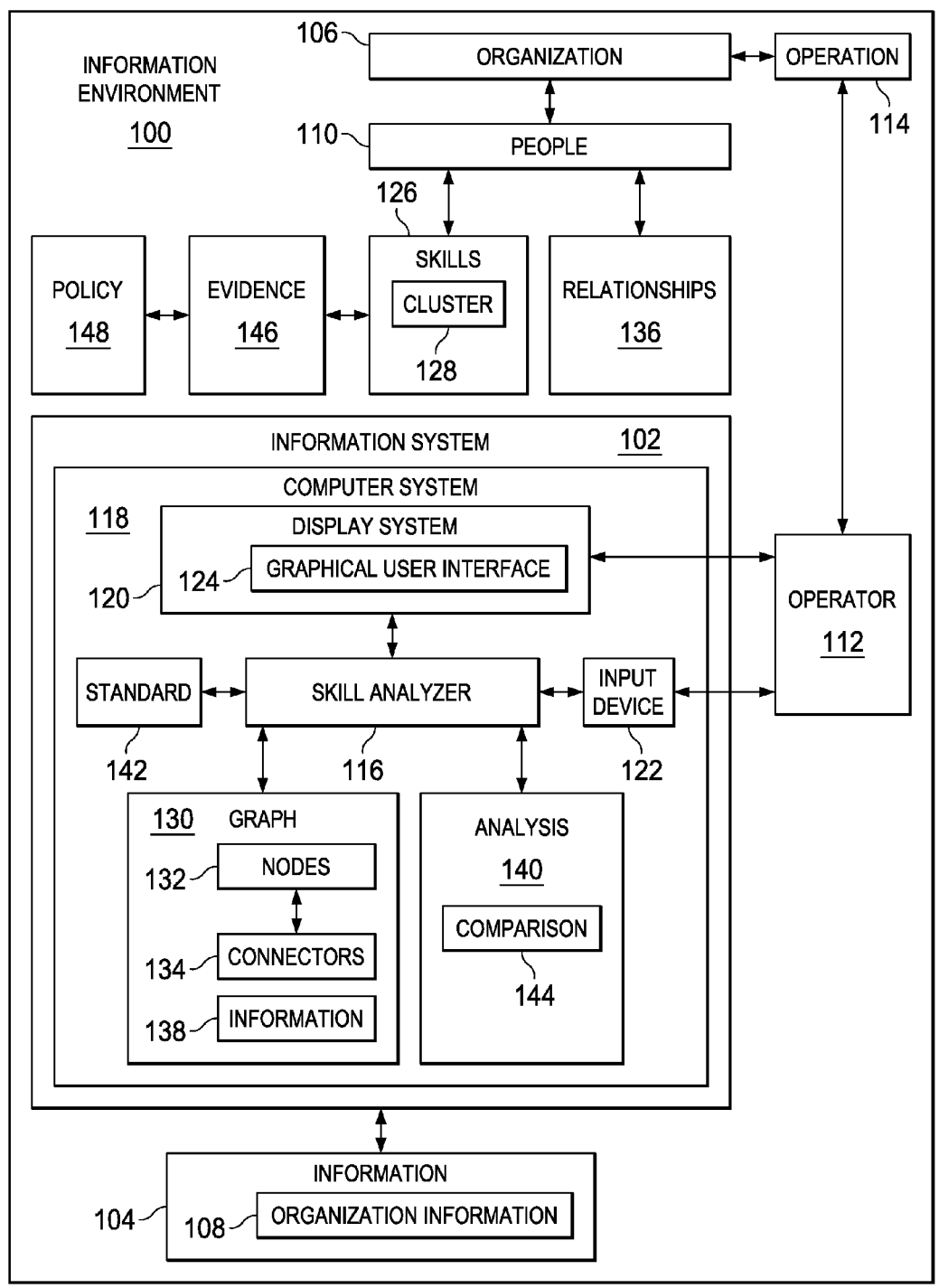
FIG. 1 is an illustration of a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 provides access to information 104. The portion of information 104 that is specifically for organization 106 is organization information 108. The access of information 104 may be at least one of reading, writing, modifying, storing, or deleting information 104.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In the illustrative example, information 104 may take different forms. For example, information 104 may be information for at least one of people, products, services, business plans, performance reviews, payroll, human resources, benefits administration, business plans, marketing, research, product development, or other suitable information.

In the illustrative example, organization 106 may be, for example, selected from one of a company, a partnership, a corporation, a charity, a city, an educational group, a social group, a team, a government entity, or some other suitable type of organization. People 110 may be employees of organization 106. In other illustrative examples, people 110 may be members of organization 106 without being employees.

Information system 102 provides access to information 104. For example, information system 102 may be used for at least one of payroll, benefits administration, research, product analysis, business planning, product development, marketing, or other suitable purposes in organization 106.

In this illustrative example, operator 112 uses information system 102 in identifying operation 114. As depicted, operation 114 may be for organization 106. Operation 114 may be selected from one of hiring, benefits administration, payroll, team formation, performance review, business planning, research, product development, product analysis, marketing, or other suitable types of operations.

As depicted, operator 112 may identify operation 114 using skill analyzer 116 in information system 102. In this illustrative example, skill analyzer 116 may be implemented in software, hardware, firmware or a combination thereof. When software is used, the operations performed by skill analyzer 116 may be implemented in program code configured to run on hardware, such as a processor unit. When firmware is used, the operations performed by skill analyzer 116 may be implemented in program code and data and stored in persistent memory to run on a processor unit. When hardware is employed, the hardware may include circuits that operate to perform the operations in skill analyzer 116.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

In this illustrative example, skill analyzer 116 may be implemented in computer system 118. Computer system 118 is a hardware system that includes one or more data processing systems. When more than one data processing system is present, those data processing systems may be in communication with each other using a communications medium. The communications medium may be a network. The data processing systems may be selected from at least one of a computer, a server computer, a tablet, or some other suitable data processing system.

As depicted, operator 112 may interact with skill analyzer 116 using display system 120 and input device 122. Graphical user interface 124 is displayed on display system 120 and provides visualization of information 104 and interaction with skill analyzer 116.

In this illustrative example, operator 112 may interact with skill analyzer 116 to identify operation 114 to perform with respect to organization 106. As depicted, skill analyzer 116 may analyze skills 126. In this example, skills 126 are for people 110 in organization 106.

As depicted, skill analyzer 116 identifies cluster 128 of skills 126 from graph 130 of people 110 in organization 106. In this illustrative example, graph 130 of people 110 includes nodes 132 for people 110, connectors 134 indicating relationships 136 between people 110, and information 138 about skills 126 for people 110.

As depicted, skills 126 may be identified as ones in which evidence 146 of skills 126 meets policy 148 that identifies when skills 126 are valid. In this illustrative example, evidence 146 is a thing that indicates at least one of the presence of a skill, the level of the skill, or other information about the skill. Policy 148 is one or more rules that may be used to determine when a skill is valid. Policy 148 also may include data that is applied to the rules along with evidence 146 in determining whether a skill is valid.

In this illustrative example, skill analyzer 116 analyzes cluster 128 of skills 126. Analysis 140 is a result from analyzing cluster 128 of skills 126. Analysis 140 may be, for example, a report, a graph, or some other suitable form that may be used to identify operation 114.

In analyzing cluster 128 of skills 126, skill analyzer 116 may compare cluster 128 of skills 126 to standard 142 to form comparison 144. In this illustrative example, standard 142 may take various forms. For example, standard 142 may be a standard generated by a standards committee, a specification, a requirements document, a group of rules, a desired set of skills, another cluster of skills 126, or some other suitable group of parameters for comparison to skills 126 and cluster 128.

As used herein, a "group of," when used with reference to items, means one or more items. For example, a "group of rules" is one or more rules. In this manner, skill analyzer 116 enables at least one of identifying or performing operation 114 for organization 106 based on comparison 144 of cluster 128 of skills 126 identified.

The illustrative example provides one or more technical solutions that overcome a technical problem of insufficient information about the skills of people being present in information systems. In one illustrative example, skill analyzer 116 provides a technical solution that identifies one or more clusters of skills. These clusters of skills are analyzed. The analysis generated provides a technical effect in which operation 114 may be identified and performed for organization 106 in a manner that is at least one of more quickly, less costly, or more accurate in obtaining a desired result of operation 114 as compared to using current techniques.

As a result, computer system 118 operates as a special purpose computer system in which skill analyzer 116 in computer system 118 enables analyzing skills 126 in a manner that allows for identifying operation 114. In the illustrative example, analysis 140 is formed through skill analyzer 116 identifying and analyzing cluster 128 of skills 126 in graph 130. In particular, skill analyzer 116 transforms computer system 118 into a special purpose computer system as compared to currently available general computer systems that do not have skill analyzer 116.

Computer system 118 performs a transformation of data. For example, computer system 118 identifies cluster 128 of skills 126 using data in the form of graph 130 to generate data in the form of analysis 140. In one depicted example, analysis 140 takes the form of comparison 144. This form of analysis 140 may be used to perform at least one of identifying or performing operation 114. In this manner, the data in graph 130 is changed into a form, such as analysis 140, and in particular, standard 142. This form has a different function or use such as that which is used for operation 114.

In FIG. 2, an illustration of a block diagram of a skill analyzer is depicted in accordance with an illustrative embodiment. In this illustrative example, skill analyzer 116 has a number of different components. As depicted, skill analyzer 116 includes cluster identifier 200, analysis generator 202, graph generator 204, and skill identifier 206.

Cluster identifier 200 identifies a cluster from a graph. In the illustrative examples, a cluster is a group of skills for a group of people identified from a graph of an organization. When the group of people includes two or more people, the group of people is people who are connected in some way. For example, the group of people may be selected from a department, a team, a division, a number of people performing a task, or any other suitable type of groups of people.

For example, cluster identifier 200 may identify cluster 128 from graph 130. In this example, the group of people is selected from a graph that depicts the group of people in an organization and relationships between the groups of people. The group of skills for the group of people in the cluster may include the group of skills of the group of people. The group of skills for the group of people may also include a skill that a person in the group has access to through a relationship to another person outside the group of people.

As depicted, analysis generator 202 generates a comparison. This comparison is selected from at least one of between a standard and a cluster or between clusters. Analysis generator 202 forms an analysis. This analysis includes the comparison. For example, analysis generator 202 may identify comparison 144 in FIG. 1 between cluster 128 and standard 142. In this example, analysis generator 202 forms analysis 140 based on comparison 144.

In this illustrative example, graph generator 204 generates a graph of at least one of people or groups of people. For example, graph generator 204 may generate graph 130 of people 110 in organization 106 from information 104.

As depicted, skill identifier 206 identifies skills for people that meet a policy of an organization. For example, skill identifier 206 may identify skills 126 for people 110 that meet policy 148.

With reference next to FIG. 3, an illustration of a block diagram of data flow for identifying a cluster of skills is depicted in accordance with an illustrative embodiment. In this figure, an example of data flow for identifying cluster 128 of skills 126 from graph 130 of people 110 in organization 106 in FIG. 1 is shown. In the illustrative examples, the same reference numeral may be used in more than one figure. This reuse of a reference numeral in different figures represents the same element in the different figures.

As shown in this figure, cluster identifier 200 identifies cluster 128 from graph 130. In this illustrative example, cluster 128 includes group of skills 302 for group of people 304.

As depicted, clustering parameters 306 are options that cluster identifier 200 uses to identify cluster 128. These options are selected from at least one of a group of skills 308 from which group of skills 302 is identified, group 310 of nodes 132 for which cluster 128 is identified, distance 312 between nodes 132 that cluster identifier 200 uses to identify skills 126 which are accessible through relationships 136, or other suitable options for identifying cluster 128.

In this illustrative example, cluster identifier 200 identifies group of people 304 from group 310 of nodes 132. A node in nodes 132 represents at least one of a person in people 110 or a group of people in people 110.

Cluster identifier 200 identifies group of skills 302 for group of people 304. Cluster identifier 200 identifies group of skills 302 based on the skills in the group of skills 308 that group of people 304 has. Cluster identifier 200 identifies group of skills 302 from information 138 in graph 130 about skills 126 for group of people 304.

Cluster identifier 200 identifies group of people 316. Group of people 316 is a group of people in nodes 132 that has a relationship in relationships 136 to at least one person in group of people 304. Group of people 316 does not include group of people 304.

Cluster identifier 200 identifies group of relationships 314 between group of people 304 and group of people 316. In this illustrative example, the relationships in group of relationships 314 are ones in which skills are imparted to group of people 304 from group of people 316. In other words, group of relationships 314 is relationships in graph 130 that allow for imparting skills to group of people 304.

For example, a person in group of people 304 may have a mentee to mentor relationship with a mentor in group of people 316. In this example, the mentee to mentor relationship results in the person at least one of learning, borrowing, or using skills of the mentor.

In this illustrative example, distance 312 between two nodes is the number of relationships between the two nodes in graph 130. For example, distance 312 between nodes is selected from zero, one, two, or other suitable distances between nodes.

The distance between two nodes that share a relationship is one. When two nodes do not share a relationship but both have a relationship with a third node, the distance between the two nodes is two. The distance is two because the third node is between the two nodes. In other words, the two nodes may communicate through the third node using the relationships the two nodes have with the third node.

Cluster identifier 200 adds a skill to group of skills 302 in cluster 128 based on group of relationships 314 between group of people 304 and group of people 316 when distance 312 in clustering parameters 306 is one or more. When distance is two or more, cluster identifier 200 repeats the process by identifying an additional group of people 110 with a distance of two or more from group of people 304 and adding skills of the additional group of people 110 to group of skills 302.

Figure 4:
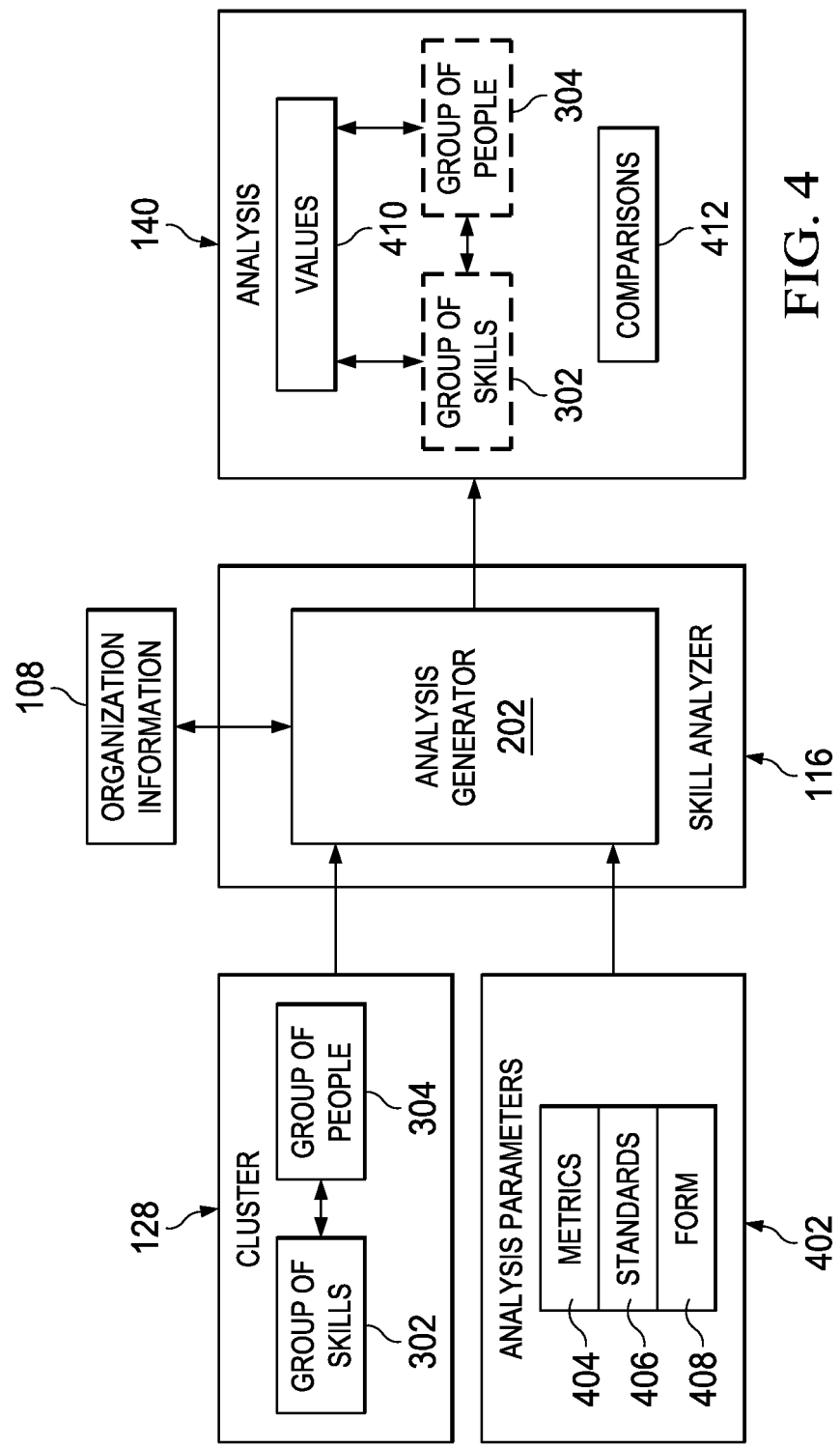
FIG. 4 is an illustration of a block diagram of data flow for analyzing a cluster of skills in accordance with an illustrative embodiment.

With reference now to FIG. 4, an illustration of a block diagram of data flow for analyzing a cluster of skills is depicted in accordance with an illustrative embodiment. In this figure, an example of data flow for analyzing cluster 128 of skills 126 to form analysis 140 is shown. In this illustration, cluster 128 includes group of skills 302 for group of people 304.

As shown in this figure, analysis generator 202 analyzes cluster 128 using analysis parameters 402. Analysis parameters 402 are options that analysis generator 202 uses to form analysis 140. These options are selected from at least one of metrics 404 to associate with cluster 128, a group of standards 406 to compare with cluster 128, form 408 of output for analysis 140, or other suitable options for forming analysis 140.

Metrics 404 are measurements of one or more parameters about an organization. The parameters may be selected from at least one of efficiency, performance, progress, quality, or other suitable things that can be measured. These measurements in metrics 404 may be for at least one of plans, processes, products, or other suitable items for an organization.

In this illustrative example, a group of metrics 404 is selected from at least one of productivity, revenue, profit, gross margin, operating costs, product inventory, customer satisfaction, customer loyalty, cost of customer acquisition, or other suitable types of metrics for organization 106. Analysis generator 202 identifies values 410 for the group of metrics 404 for group of people 304. Values 410 are quantities that represent levels of performance of group of people 304 for the group of metrics 404. These quantities may be selected from at least one of numbers or percentages.

Analysis generator 202 identifies values 410 from organization information 108. For example, organization information 108 may include the group of metrics 404 for group of people 304. As another example, analysis generator 202 may calculate values 410 from data in organization information 108.

In this illustrative example, form 408 of output for analysis 140 is selected from at least one of a report, a graph, a table, or some other suitable form that may be used to identify operation 114. Analysis generator 202 creates analysis 140 using the form selected. Analysis 140 includes values 410 for the group of metrics 404 for group of people 304. As depicted, group of skills 302 of group of people 304 is associated with values 410 for the group of metrics 404.

In this illustrative example, analysis generator 202 generates comparisons 412 between the group of standards 406 and cluster 128. Comparisons 412 are examples of comparison 144 in FIG. 1. As depicted, analysis generator 202 includes comparisons 412 in analysis 140.

Figure 5:
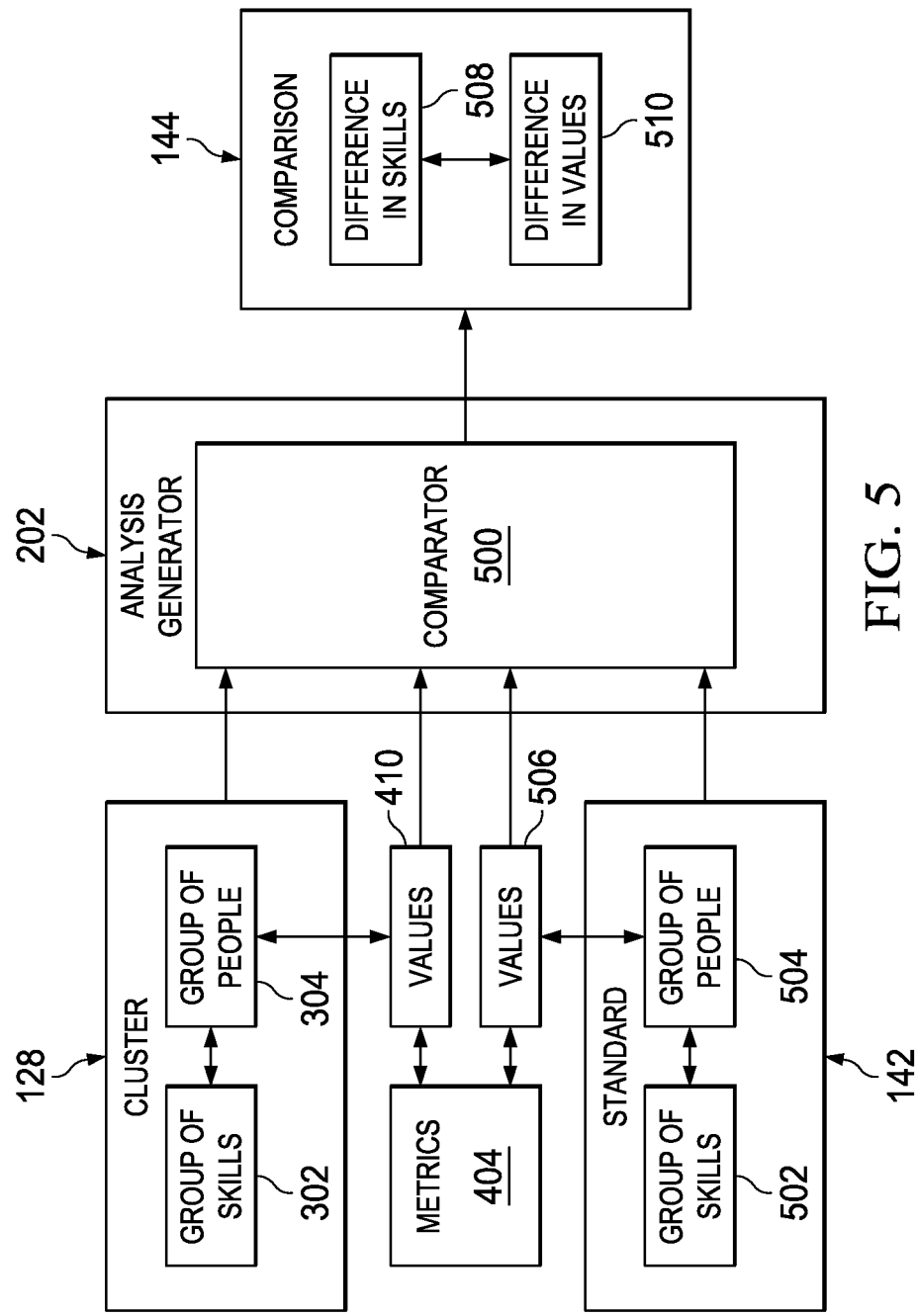
FIG. 5 is an illustration of a block diagram of data flow for comparing a cluster of skills to a standard in accordance with an illustrative embodiment.

Turning to FIG. 5, an illustration of a block diagram of data flow for comparing a cluster of skills to a standard is depicted in accordance with an illustrative embodiment. In this figure, an example of data flow for comparing cluster 128 to standard 142 to form comparison 144 is shown. In this illustration, cluster 128 includes group of skills 302 for group of people 304, and values 410 for the group of metrics 404 are for group of people 304.

In this illustrative example, analysis generator 202 includes comparator 500. As depicted, comparator 500 identifies group of skills 502 for group of people 504 for standard 142. For example, comparator 500 may identify group of skills 502 for group of people 504 from at least one of information 104, graph 130, or some other suitable source.

Comparator 500 also identifies values 506 for the group of metrics 404 for group of people 504 in standard 142. In this illustrative example, values 506 are identified from at least one of information 104, an analysis of standard 142, or some other suitable source.

As depicted, comparator 500 identifies difference in skills 508 between cluster 128 and standard 142. Comparator 500 also identifies difference in values 510 between values 410 for cluster 128 and values 506 for standard 142. Comparator 500 includes difference in skills 508 and difference in values 510 in comparison 144.

For example, when values 506 include operating costs, difference in values 510 is the difference in operating costs. As another example, when these values include percentage of progress to plans, difference in values 510 is the difference in percentage of progress to the plans.

In this illustrative example, difference in skills 508 indicates a reason for difference in values 510. For example, when difference in skills 508 is a particular skill that is not in cluster 128 and difference in values 510 is a change in productivity, the particular skill indicates a reason for the change in productivity.

Comparison 144 is used, in this illustrative example, to perform at least one of identifying or performing operation 114. For example, operation 114 may be to change cluster 128 to include the particular skill that resulted in a change in productivity in standard 142.

Figure 6:
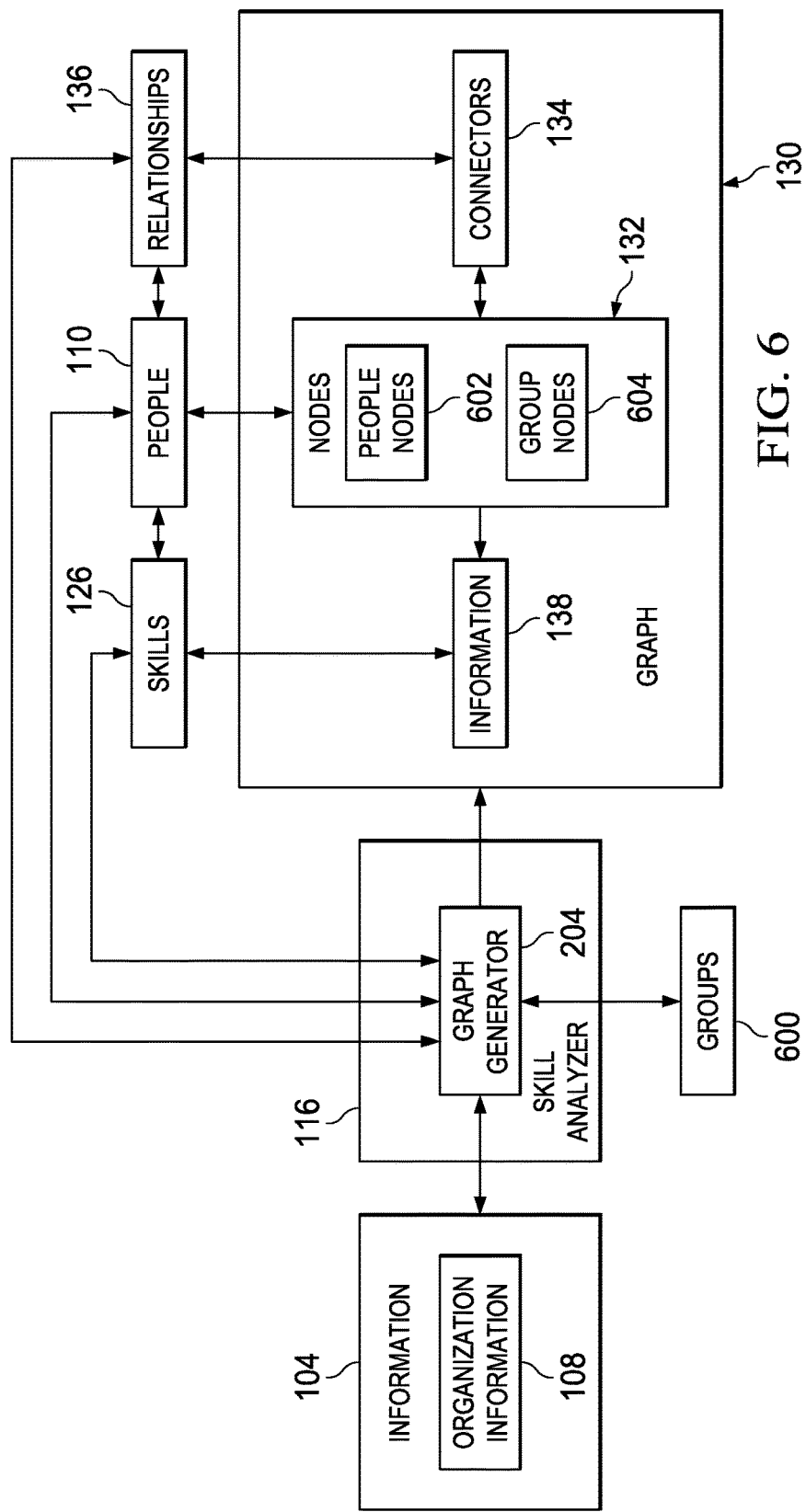
FIG. 6 is an illustration of a block diagram of data flow for generating a graph in accordance with an illustrative embodiment.

Turning next to FIG. 6, an illustration of a block diagram of data flow for generating a graph is depicted in accordance with an illustrative embodiment. In this figure, an example of data flow for generating graph 130 is shown. In this illustration, graph 130 of people 110 in organization 106 is generated from information 104.

As shown in this figure, graph generator 204 identifies people 110 and groups 600 of people 110 in organization 106. Graph generator 204 identifies people 110 and groups 600 of people 110 from organization information 108. For example, organization information 108 may include people 110 and groups of people 110 in organization 106.

In this illustrative example, relationships 136 are between at least one of people 110, groups 600, or people 110 and groups 600. Graph generator 204 identifies relationships 136 from organization information 108 in this illustrative example. For example, organization information 108 may include relationships 136.

Graph generator 204 further identifies skills 126 for people 110. For example, graph generator 204 may identify skills 126 based on information 104 about skills 126 for people 110.

As depicted, graph generator 204 creates nodes 132 in graph 130. In this illustrative example, nodes 132 include people nodes 602 for people 110 and group nodes 604 for groups 600.

Graph generator 204 also creates connectors 134 between nodes 132 based on relationships 136. In this illustrative example, connectors 134 indicate relationships 136 between at least one of people nodes 602, group nodes 604, or people nodes 602 and group nodes 604.

Graph generator 204 further includes information 138 about skills 126 for people 110 in graph 130. As depicted, nodes 132 include at least one of information 138 or point to information 138.

Figure 7:
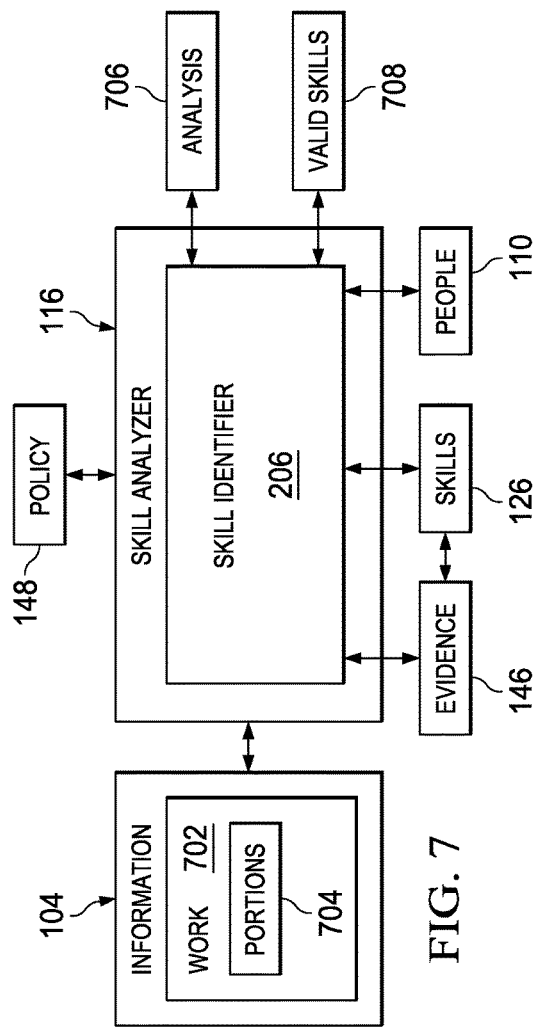
FIG. 7 is an illustration of a block diagram of data flow for identifying skills in an organization in accordance with an illustrative embodiment.

Turning now to FIG. 7, an illustration of a block diagram of data flow for identifying skills in an organization is depicted in accordance with an illustrative embodiment. In this figure, an example of data flow for identifying skills 126 for people 110 that meet policy 148 through skill analyzer 116 is shown.

As shown in this figure, skill identifier 206 searches information 104 for work 702 produced by people 110. In this illustrative example, skill identifier 206 includes the functionality of at least one of a web crawler, an email analyzer, or other suitable types of tools to search information 104 for work 702 produced by people 110.

As depicted, skill identifier 206 searches for portions 704 of work 702 produced by people 110. Work 702, in this example, is selected from at least one of an endorsement, an evaluation, an email message, a published article, a memorandum, a patent, a prototype, research information, a product, program code, presentation materials, computer aided designs, physical models, or other suitable types of work.

In this illustrative example, portions 704 are subdivisions or pieces of work 702. For example, a portion in portions 704 is selected from at least one of paragraphs, a block of program code, a section of computer aided design, a chart in a presentation, an article, a message, or other suitable types of portions 704 of work 702.

The searching may be performed by matching words in work 702 to skills 126. In this illustrative example, evidence 146 of skills 126 is in portions 704 of work 702.

For example, when skills 126 include internationalization programming, work 702 may include program code written by people 110. In this example, skill identifier 206 searches for portions of program code that include words matching a group of words used by internationalization programmers.

Skill identifier 206 applies a group of rules in policy 148 to evidence 146. Skill identifier 206 forms analysis 706 based on the results of applying the group of rules to evidence 146.

For example, one rule in policy 148 may verify authorship for evidence. In this example, skill identifier 206 determines whether people 110 are authors of evidence 146. The determination may be made by determining whether the identification of information for authorship of evidence 146 matches the identification information for people 110. This identification information is selected from at least one of a name, a phone number, or any other suitable alpha numeric identification for people 110.

Another rule in policy 148 may be to verify that evidence 146 shows a level of skill exceeding a minimum threshold for skills 126. In this example, skill identifier 206 processes evidence 146 to determine the level of skill for skills 126 shown in evidence 146.

Still another rule in policy 148 may be to verify that the endorser of any endorsement used as evidence 146 is an approved endorser. An endorser is an approved endorser when the endorser has sufficient proficiency for endorsing skills 126 for people 110 of organization 106. When the endorser is approved, the endorsements made by the endorser can be relied upon. However, when applied to policy 148, the endorsements may not make skills 126 valid skills for people 110. For example the endorser may state that people 110 have levels of proficiency in skills 126. The level of proficiency in the endorsements can be relied upon as being correct. However, the levels of proficiency may not be sufficient to make skills 126 valid for people 110 when applied to policy 148.

In this example, when evidence 146 includes endorsements, skill identifier 206 may compare the endorsers of the endorsements to approved endorsers. For example, an approved endorser with a high level of proficiency for making endorsements may be specified in organization information 108. Using only endorsements provided by approved endorsers ensures that the endorsements are reliable for use as evidence 146.

For example, organization 106 may have a rule in policy 148 that only endorsers with a high level of proficiency for making endorsements may endorse skills 126 for people 110. In this example, forming a team of people 110 based on these skills for people that meet policy 148 has a higher likelihood of success than when endorsers having a low level of proficiency are allowed to make endorsements.

Skill identifier 206 adds skills 126 for people 110 to valid skills 708 for people when evidence 146 is sufficient to meet policy 148. In this case, skills 126 for people 110 which are valid based on analysis 706 are added to valid skills 708 for people 110.

In this illustrative example, valid skills 708 includes information specifying which people in people 110 have which skills in skills 126. The information in valid skills 708 also include at least one of pointers to evidence 146, analysis 706 of evidence 146, or other suitable types of information for specifying which of people 110 have which of skills 126.

In this illustrative example, valid skills 708 may be relied on for making decisions on what operations to perform for an organization. Valid skills 708 are ones that have met policy 148.

Figure 8:
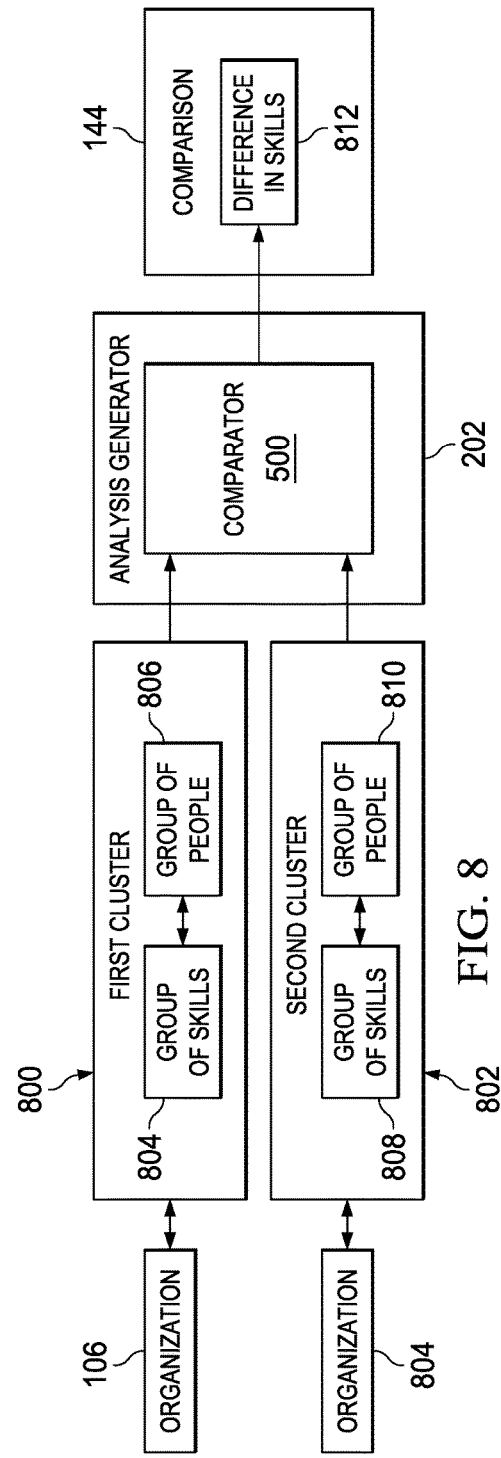
FIG. 8 is an illustration of a block diagram of data flow for comparing two clusters in accordance with an illustrative embodiment.

In FIG. 8, an illustration of a block diagram of data flow for comparing two clusters is depicted in accordance with an illustrative embodiment. In this figure, an example of data flow for comparing a first cluster to a second cluster is shown. In this illustration, first cluster 800 is an example of cluster 128 for organization 106. Second cluster 802 is an example of a cluster of skills for people in organization 804. Organization 804 is an example of another organization other than organization 106.

In this illustrative example, analysis generator 202 includes comparator 500. As depicted, comparator 500 identifies group of skills 808 for group of people 806 for first cluster 800. For example, comparator 500 may identify group of skills 808 for group of people 806 from at least one of information 104, graph 130, or some other suitable source.

Comparator 500 also identifies group of skills 808 for group of people 810 for second cluster 802. For example, comparator 500 may identify group of skills 808 for group of people 810 from at least one of information 104, a graph for organization 804, or some other suitable source.

As depicted, comparator 500 identifies difference in skills 812 between first cluster 800 and second cluster 802. Comparator 500 includes difference in skills 812 in comparison 144.

In this illustrative example, comparison 144 is used to perform at least one of identifying or performing operation 114 in FIG. 1. For example, difference in skills 812 may indicate a particular skill missing from group of skills 808. In this example, operation 114 is selected from at least one of training a person in group of people 806 in the particular skill, hiring a person that has the particular skill, adding a relationship to a person in group of people 806 that points to another person that has the particular skill, or some other suitable operation.

Figure 9:
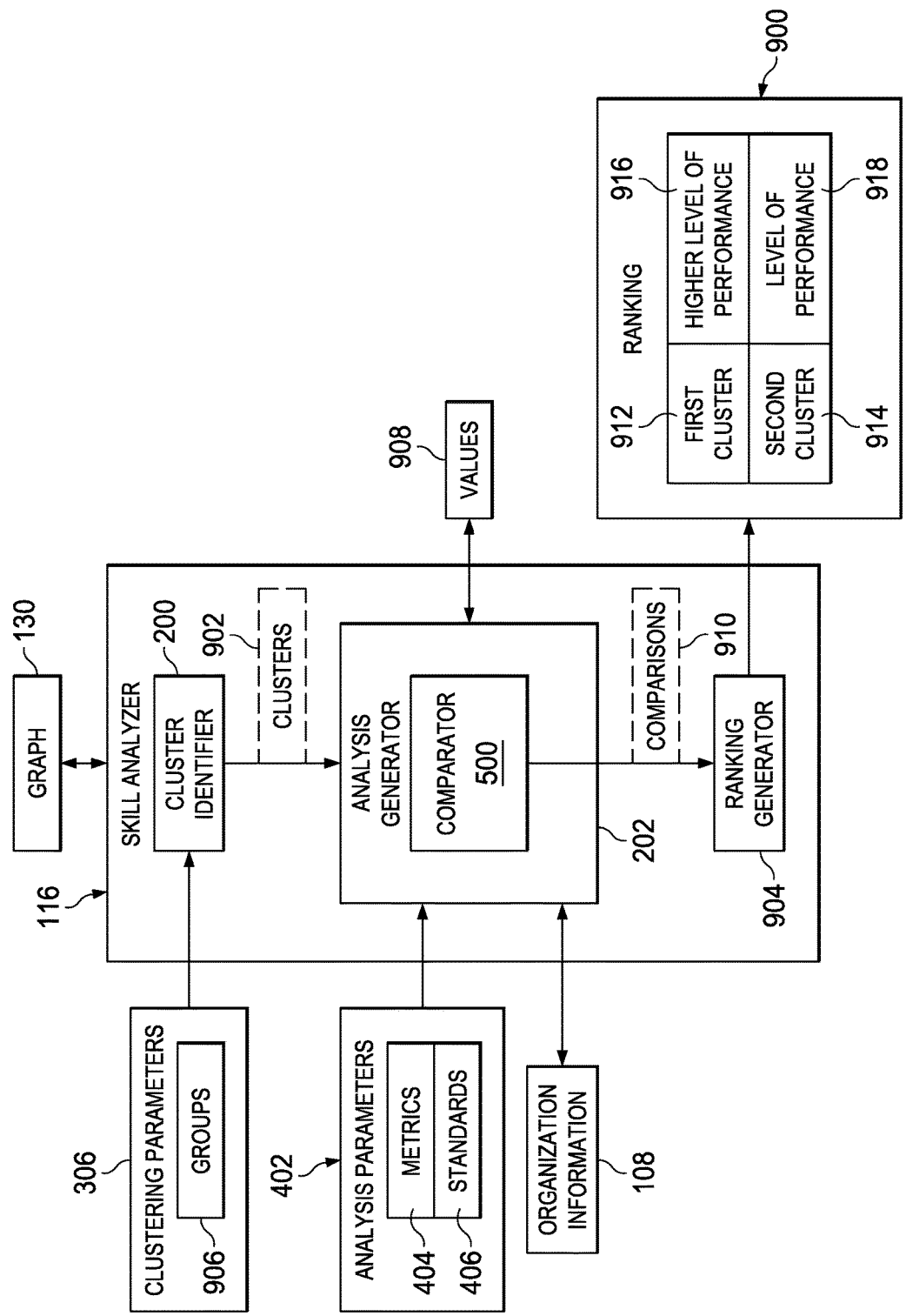
FIG. 9 is an illustration of a block diagram of data flow for identifying a ranking of clusters in accordance with an illustrative embodiment.

With reference next to FIG. 9, an illustration of a block diagram of data flow for identifying a ranking of clusters is depicted in accordance with an illustrative embodiment. In this figure, an example of data flow for identifying ranking 900 of clusters 902 based on standard 142 is shown. In this illustration, clusters 902 are examples of cluster 128.

In this illustrative example, skill analyzer 116 includes cluster identifier 200, analysis generator 202, and ranking generator 904. As depicted, cluster identifier 200 identifies clusters 902 from graph 130.

Clustering parameters 306 includes groups 906 of nodes 132 in this illustrative example. Cluster identifier 200 identifies clusters 902 from groups 906 of nodes of nodes 132.

Analysis generator 202 receives clusters 902 from cluster identifier 200. As depicted, analysis generator 202 identifies values 908 for the group of metrics 404 for clusters 902. Analysis generator 202 identifies values 908 from organization information 108. As depicted, groups of skills of groups of people in clusters 902 are associated with values 908 for the group of metrics 404.

In this illustrative example, comparator 500 in analysis generator 202 generates comparisons 910 between the group of standards 406 and clusters 902. Comparisons 910 are examples of comparison 144 in FIG. 1.

As depicted, ranking generator 904 identifies ranking 900 of clusters 902 based on comparisons 910. In this illustrative example, ranking 900 includes first cluster 912 and second cluster 914. First cluster 912 is the cluster in clusters 902 with higher level of performance 916 than level of performance 918 for second cluster 914. In this illustrative example, level of performance of a cluster in clusters 902 is higher than the level of performance of other clusters when values 908 for the cluster are higher than values 908 for the other clusters.

The illustration of information environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although skills 126 have been described with respect to people 110 in organization 106, skills 126 may be for people 110 in one or more organizations in addition to or in place of organization 106. In other words, the analysis of skills 126 may be for people 110 in more than one organization.

Additionally, analysis 140 may take other forms in addition to or in place of comparison 144. For example, analysis 140 may include a notification of an action to perform. For example, the notification may identify a person to add to a group of people to improve a level of performance of the group. As another example, the notification may identify a skill to train a person to improve a level of performance for the person.

In still another illustrative example, nodes 132 may include nodes for things in addition to or in place of people 110. For example, nodes 132 that represent people are people nodes. Nodes may also be present in nodes 132 that represent groups of people 110 in organization 106. These nodes for the group are group nodes in nodes 132. Group nodes may include, for example, a division, a team, a department, or some other grouping of people 110.

Figure 10:
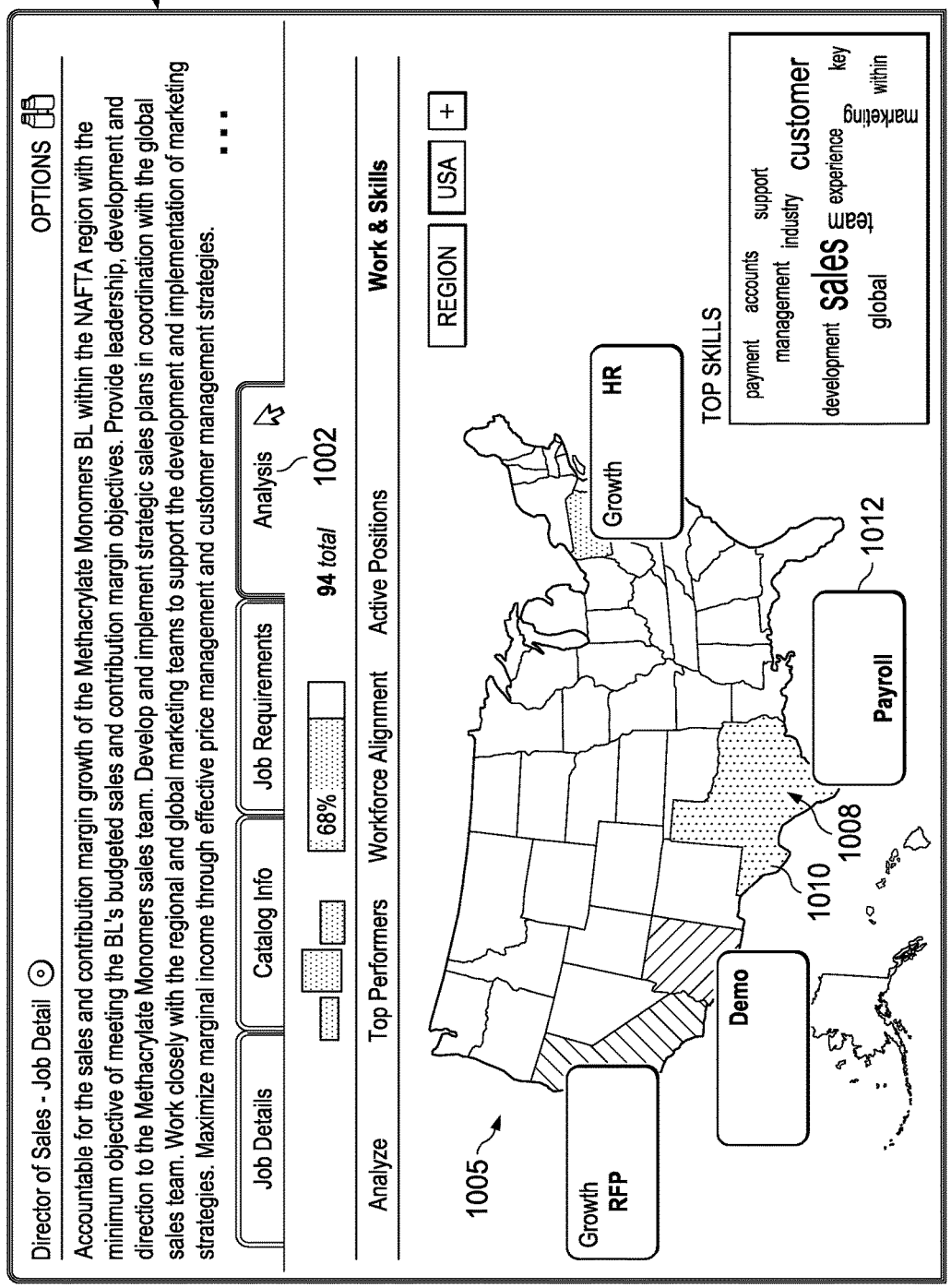
FIG. 10 is an illustration of a graphical user interface for viewing clusters of skills for an organization in accordance with an illustrative embodiment.
Figure 11:
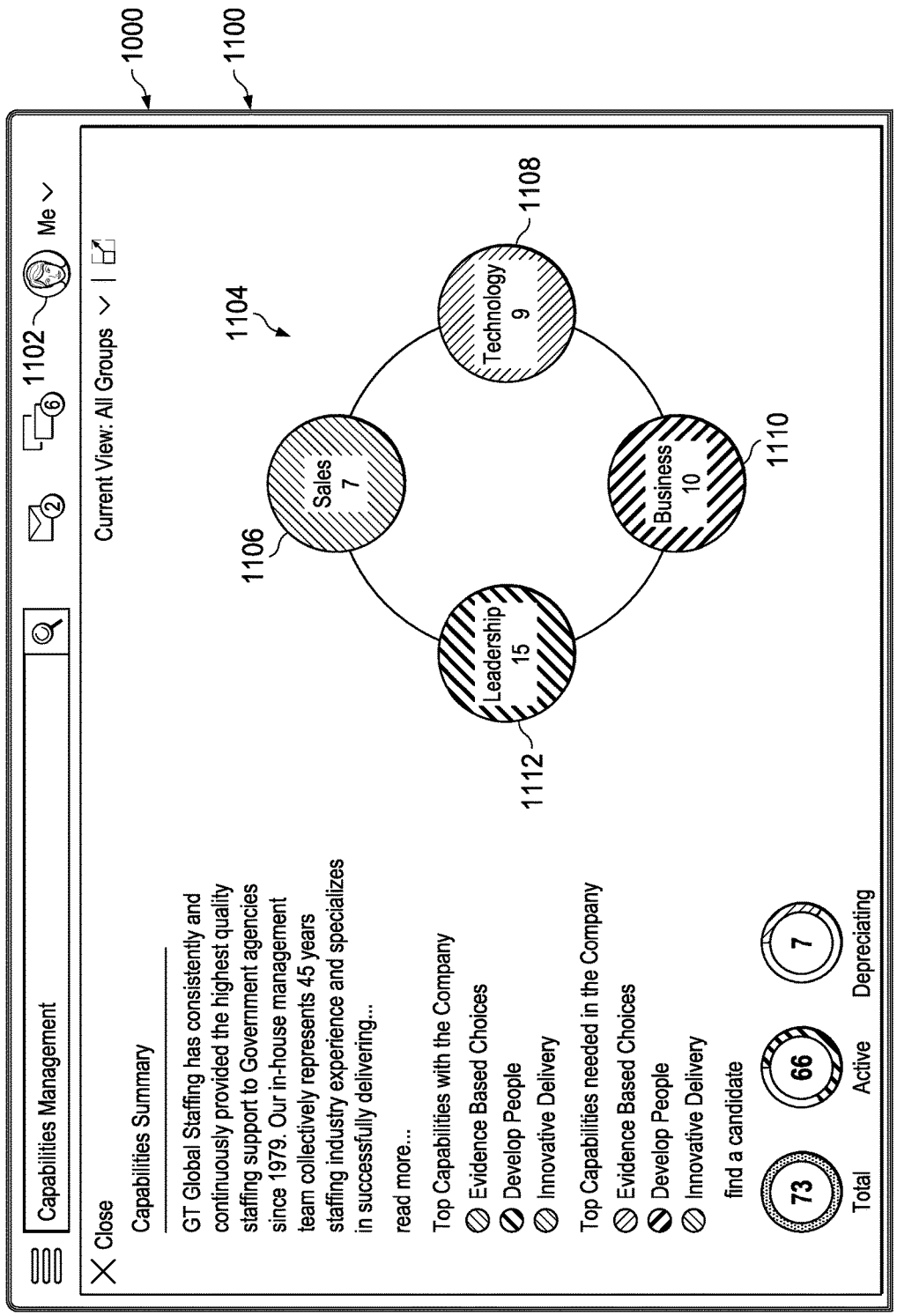
FIG. 11 is an illustration of a graphical user interface for viewing clusters of skills for an organization in accordance with an illustrative embodiment.
Figure 12:
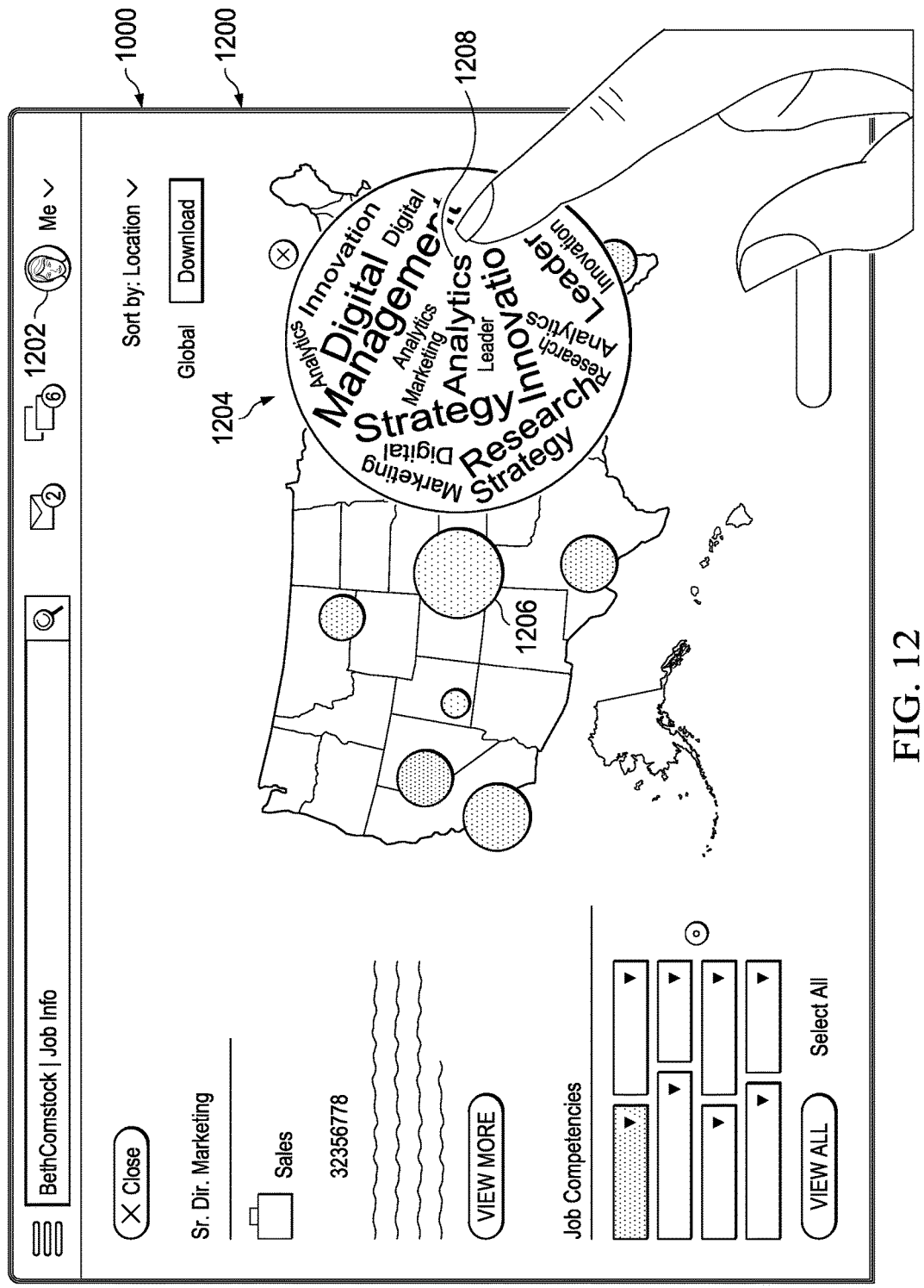
FIG. 12 is an illustration of a graphical user interface for viewing clusters of skills for an organization in accordance with an illustrative embodiment.

FIGS. 10-12 are illustrative examples of a graphical user interface that may be used to display information about clusters of skills. With reference first to FIG. 10, an illustration of a graphical user interface for viewing clusters of skills for an organization is depicted in accordance with an illustrative embodiment. As depicted, graphical user interface 1000 is an example of one implementation for graphical user interface 124 shown in block form in FIG. 1. In this illustration, a ranking of clusters of skills is shown on a map of the United States of America.

In this illustrative example, graphical user interface 1000 displays a number of different graphical elements. As depicted, graphical user interface 1000 includes analysis 1002. Analysis 1002 is an example of a visualization of analysis 140 shown in block form in FIGS. 1 and 4.

As depicted, analysis 1002 includes ranking of states 1005. States 1005 are examples of visual representations of clusters 902 shown in block form in FIG. 9. In this illustrative example, states 1005 represent clusters of skills for groups of people located in states within the United States of America. In this illustrative example, a ranking of clusters represented by states 1005 are displayed using indicators selected from at least one of color, shades of color, hashing, images, or any other suitable type of indicator. For example, Texas 1008 is displayed in shade 1010. Shade 1010 for Texas 1008 indicates the ranking of the cluster that Texas 1008 represents.

Texas 1008 visually represents a cluster of skills for people in Texas 1008. The cluster represented by Texas 1008 is an example of first cluster 912 shown in block form in FIG. 9.

In this illustrative example, word cloud 1012 is displayed for Texas 1008. Word cloud 1012 is a visual representation of difference in skills 508 shown in block form in FIG. 5.

With reference next to FIG. 11, an illustration of a graphical user interface for viewing clusters of skills for an organization is depicted in accordance with an illustrative embodiment. In this illustration, a difference in skills between a cluster of skills for a person and a standard is shown.

In this illustrative example, graphical user interface 1000 includes analysis 1100. Analysis 1100 is an example of a visualization of analysis 140 shown in block form in FIGS. 1 and 4.

As depicted, analysis 1100 includes person 1102. In this illustrative example, person 1102 represents a cluster of skills 1104. Skills 1104 include sales 1106, technology 1108, business 1110, and leadership 1112. Skills 1104 are skills identified as needed by person 1102 in analysis 1100. Skills 1104 are a visual representation of difference in skills 508 in FIG. 5.

With reference now to FIG. 12, an illustration of a graphical user interface for viewing clusters of skills for an organization is depicted in accordance with an illustrative embodiment. In this illustration, a difference in skills between a cluster of skills for a person and a group of clusters is shown.

In this illustrative example, graphical user interface 1000 includes analysis 1200. Analysis 1200 is an example of a visualization of analysis 140 shown in block form in FIGS. 1 and 4.

As depicted, analysis 1200 includes person 1202. Person 1202 represents a cluster of skills. Analysis 1200 includes ranking of regions 1204. Regions 1204 are examples of visual representations of clusters 902 shown in block form in FIG. 9.

In this illustrative example, regions 1204 represent clusters of skills for groups of people located in regions 1204 within the United States of America. In this illustrative example, a ranking of clusters represented by regions 1204 is displayed using an indicator selected from at least one of color, hashing, images, or any other suitable type of indicator. For example, region 1206 is displayed with an indicator that reflects the relative ranking of region 1206 in the ranking of regions 1204.

In this illustrative example, word cloud 1208 is displayed for region 1206. Word cloud 1208 is a visual representation of difference in skills 508 shown in block form in FIG. 5.

The illustration of the graphical user interfaces in FIG. 10-12 are only presented as examples and not meant to limit the manner in which graphical user interface 124 shown in block form in FIG. 1 may be implemented. For example, regions 1204 in FIG. 12 could be any shape, not just circles. As another example, person 1202 could be all of the people in a department in an organization, not just one person.

Figure 13:
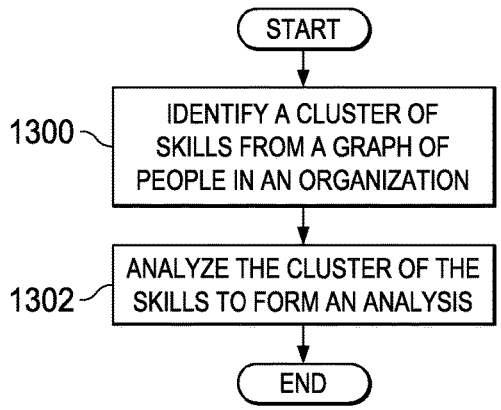
FIG. 13 is an illustration of a flowchart of a process for analyzing skills for an organization in accordance with an illustrative embodiment.

Turning next to FIG. 13, an illustration of a flowchart of a process for analyzing skills for an organization is depicted in accordance with an illustrative embodiment. The process illustrated in FIG. 13 may be implemented in information environment 100 in FIG. 1. In particular, the process may be implemented in skill analyzer 116 in computer system 118.

The process begins by identifying a cluster of skills from a graph of people in an organization (step 1300). The graph of the people includes nodes for the people, connectors indicating relationships between the people, and information about the skills for the people.

The process analyzes the cluster of the skills to form an analysis (step 1302), with the process terminating thereafter. This process enables performing an operation for organization based on the analysis of cluster of skills identified.

Figure 14:
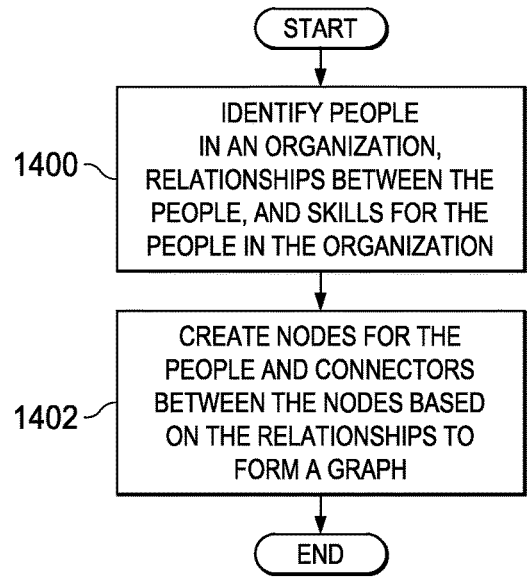
FIG. 14 is an illustration of a flowchart of a process for creating a graph in accordance with an illustrative embodiment.

With reference next to FIG. 14, an illustration of a flowchart of a process for creating a graph is depicted in accordance with an illustrative embodiment. The graph created in FIG. 14 may be used by the process in FIG. 13 to analyze the cluster of the skills.

The process begins by identifying people in an organization, relationships between the people, and skills for the people in the organization (step 1400). The process creates nodes for the people and connectors between the nodes based on the relationships to form a graph (step 1402), with the process terminating thereafter. The nodes include information about the skills for the people.

Figure 15:
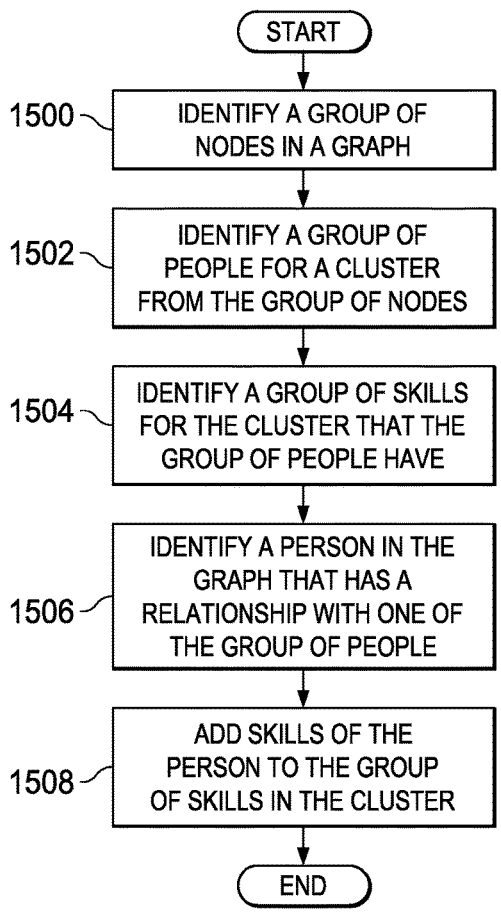
FIG. 15 is an illustration of a flowchart of a process for identifying a cluster in accordance with an illustrative embodiment.

With reference now to FIG. 15, an illustration of a flowchart of a process for identifying a cluster is depicted in accordance with an illustrative embodiment. The process in this illustration is one example of an implementation for step 1300 in FIG. 13. The process illustrated in FIG. 15 may be implemented in information environment 100 in FIG. 1. In particular, the process may be implemented in cluster identifier 200 in FIG. 3.

The process begins by identifying a group of nodes in a graph (step 1500). The nodes in the graph represent at least one of people or groups of people. Each node may represent a person or a group of people.

The process identifies a group of people for a cluster from the group of nodes (step 1502). All of the people in a node in the group of nodes are placed into the cluster in step 1502. The process next identifies a group of skills for the cluster that the group of people have (step 1504).

The process identifies a person in the graph that has a relationship with one of the group of people (step 1506). The relationship is one in which skills are imparted through the relationship. The person is not one of the people already in the group of people in the cluster. The process then adds skills of the person to the group of skills in the cluster (step 1508), with the process terminating thereafter.

Figure 16:
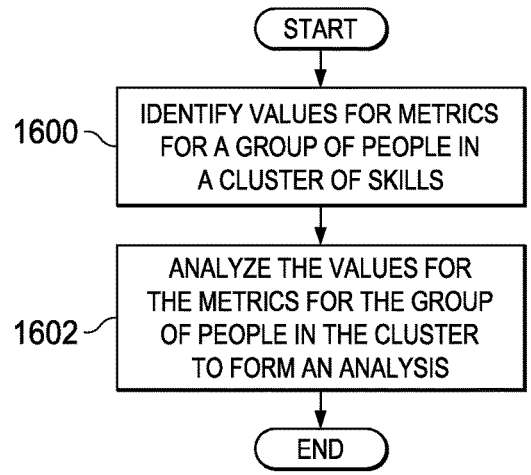
FIG. 16 is an illustration of a flowchart of a process for analyzing a cluster of skills in accordance with an illustrative embodiment.

With reference now to FIG. 16, an illustration of a flowchart of a process for analyzing a cluster of skills is depicted in accordance with an illustrative embodiment. The process illustrated in FIG. 16 is one example of an implementation for step 1302 in FIG. 13. The process in this illustration, may be implemented in information environment 100 in FIG. 1. In particular, the process may be implemented in analysis generator 202 in FIG. 4.

The process begins by identifying values for metrics for a group of people in a cluster of skills (step 1600). The process analyzes the values for the metrics for the group of people in the cluster to form an analysis (step 1602), with the process terminating thereafter. The process may also include a comparison between the cluster and a standard in the analysis.

With reference now to FIG. 17, an illustration of a flowchart of a process for generating a comparison between a cluster of skills and a standard is depicted in accordance with an illustrative embodiment. The process illustrated in FIG. 17 is one example of an implementation for generating a comparison for inclusion in the analysis in step 1302 in FIG. 13. The process in this illustration may be implemented in information environment 100 in FIG. 1. In particular, the process may be implemented in comparator 500 in FIG. 5.

The process begins by identifying a difference in skills between a cluster and a standard (step 1700). The process identifies a difference in values for metrics between the cluster and the standard (step 1702). The process then generates a comparison between the cluster and the standard based on a difference in skills and a difference in values (step 1704), with the process terminating thereafter.

With reference next to FIG. 18, an illustration of a flowchart of a process for identifying skills is depicted in accordance with an illustrative embodiment. The skills identified in FIG. 18 may be used by the process in FIG. 15 to identify a group of skills for the cluster that the group of people in the cluster have.

The process begins by searching information for work produced by a group of people that includes evidence of skills (step 1800). The process identifies a group of skills for which the evidence in portions of the work meet a policy identifying when the group of skills are valid (step 1802), with the process terminating thereafter.

With reference now to FIG. 19, an illustration of a flowchart of a process for analyzing skills for an organization is depicted in accordance with an illustrative embodiment. The process in this illustration may be implemented in information environment 100 in FIG. 1. In particular, the process may be implemented in skill analyzer 116 in computer system 118.

The process begins by identifying a number of clusters of skills for a number of groups of people in a graph (step 1900). The number of groups of the people form a plurality of groups of the people.

The process compares the number of clusters of the skills to a standard to form a number of comparisons (step 1902). The number of comparisons forms a plurality of comparisons.

The process next identifies a ranking for a plurality of groups of the people based on a plurality of comparisons (step 1904). The ranking identifies a first group of the people in the plurality of groups of the people with a higher level of performance than a second group of the people in the plurality of groups of the people with respect to the standard.

The process then identifies a difference between a first cluster of the skills for a first group of the people and a second cluster of the skills in a second group of the people (step 1906), with the process terminating thereafter. The difference in step 1906 is selected from at least one of different amounts of skills, a different number of employees, different numbers of employees of particular types, a different number of relationships, or different types of relationships. The difference in step 1906 is associated with the higher level of performance for the first group of the people over the second group of the people in the ranking.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
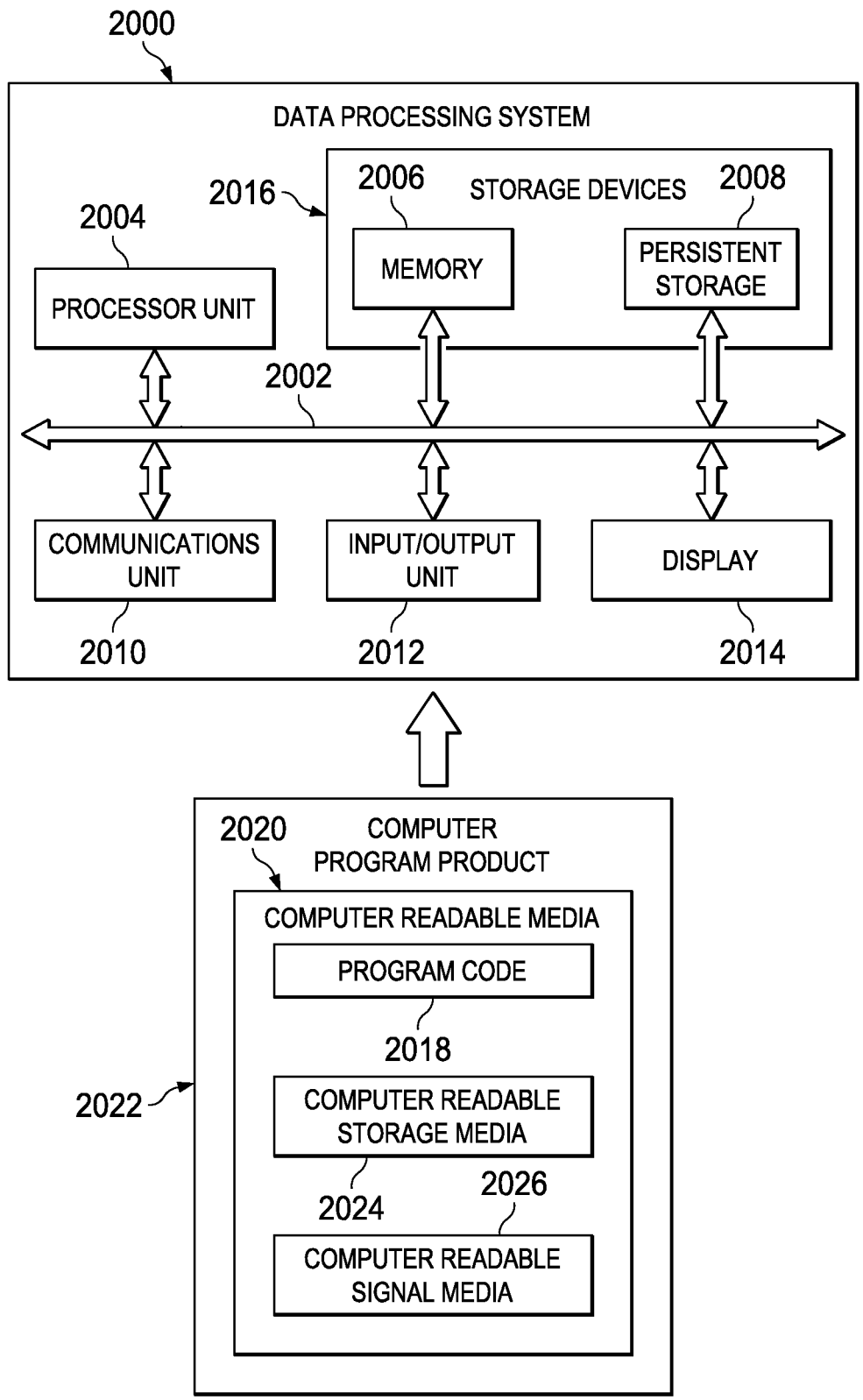
FIG. 20 is an illustration of a block diagram of a data processing system in accordance with an illustrative embodiment.

Turning now to FIG. 20, an illustration of a block diagram of a data processing system is depicted in accordance with an illustrative embodiment. Data processing system 2000 may be used to implement one or more computers or other data processing devices in computer system 118 in FIG. 1. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 may take the form of a bus system.

Processor unit 2004 serves to execute instructions for software that may be loaded into memory 2006. Processor unit 2004 may be a number of processors, a multi-processor core, or some other type of processor, depending on the particular implementation.

Memory 2006 and persistent storage 2008 are examples of storage devices 2016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2016 may also be referred to as computer readable storage devices in these illustrative examples. Memory 2006, in these examples, may be, for example, a random access memory or any other suitable volatile or non-volatile storage device. Persistent storage 2008 may take various forms, depending on the particular implementation.

For example, persistent storage 2008 may contain one or more components or devices. For example, persistent storage 2008 may be a hard drive, a flash memory, a rewritable optical disk, a rewritable magnetic tape, or some combination of the above. The media used by persistent storage 2008 also may be removable. For example, a removable hard drive may be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that may be connected to data processing system 2000. For example, input/output unit 2012 may provide a connection for user input through at least of a keyboard, a mouse, or some other suitable input device. Further, input/output unit 2012 may send output to a printer. Display 2014 provides a mechanism to display information to a user.

Instructions for at least one of the operating system, applications, or programs may be located in storage devices 2016, which are in communication with processor unit 2004 through communications framework 2002. The processes of the different embodiments may be performed by processor unit 2004 using computer-implemented instructions, which may be located in a memory, such as memory 2006.

These instructions are referred to as program code, computer usable program code, or computer readable program code that may be read and executed by a processor in processor unit 2004. The program code in the different embodiments may be embodied on different physical or computer readable storage media, such as memory 2006 or persistent storage 2008.

Program code 2018 is located in a functional form on computer readable media 2020 that is selectively removable and may be loaded onto or transferred to data processing system 2000 for execution by processor unit 2004. Program code 2018 and computer readable media 2020 form computer program product 2022 in these illustrative examples.

In one example, computer readable media 2020 may be computer readable storage media 2024 or computer readable signal media 2026. In these illustrative examples, computer readable storage media 2024 is a physical or tangible storage device used to store program code 2018 rather than a medium that propagates or transmits program code 2018.

Alternatively, program code 2018 may be transferred to data processing system 2000 using computer readable signal media 2026. Computer readable signal media 2026 may be, for example, a propagated data signal containing program code 2018. For example, computer readable signal media 2026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2000 are not meant to provide architectural limitations to the manner in which different embodiments may be implemented. The different illustrative embodiments may be implemented in a data processing system including components in addition to or in place of those illustrated for data processing system 2000. Other components shown in FIG. 20 can be varied from the illustrative examples shown. The different embodiments may be implemented using any hardware device or system capable of running program code 2018.

Thus, the illustrative embodiments provide a method and apparatus for analyzing skills. The illustrative embodiments provide a method and apparatus that overcome a technical problem of insufficient information about the skills of people being present in information systems.

In one illustrative example, skill analyzer 116 provides a technical solution that identifies one or more clusters of skills. These clusters of skills are analyzed. The analysis generated may be used to identify and perform operations for an organization.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method, comprising:
   identifying, by a computer system, a first cluster of skills, a second cluster of skills, and a standard;
   identifying, by the computer system, a third cluster of skills from a graph of people, wherein people of the graph of people comprise an organization, and the graph of people comprises: nodes for the people, relationships between the people, connectors indicating the relationships between the people, and information about skills of the people;

comparing, by the computer system, the third cluster of skills to the standard to form a comparison, wherein the third cluster of skills is the first cluster of skills, the graph of people is a first graph, the standard is the second cluster of skills, and comparing the third cluster of skills to the standard comprises identifying a difference based on the first cluster of skills being different than the second cluster of skills; and enabling, by the computer system, performance of an operation for the organization based on the comparison.

2. The method of claim 1 further comprising: performing the operation for the organization based on the comparison.

3. The method of claim 1 further comprising:
identifying, by the computer system, the people in the organization, the relationships between the people, and the skills of the third cluster of skills; and
creating, by the computer system, the nodes for the people and the connectors between the nodes based on the relationships to form the graph of people, wherein the nodes include the information about the skills of the third cluster of skills.

4. The method of claim 1, wherein the nodes for the people are people nodes, and wherein the graph of people further includes group nodes for groups of the people within the organization, and the connectors indicate the relationships between at least one of the people nodes or the group nodes.

5. The method of claim 1, wherein the skills are identified as ones in which evidence of the skills meets a policy that identifies when the skills are valid.

6. The method of claim 1, wherein the first cluster of skills is for a first group of people and the second cluster of skills is for a second group of people.

7. The method of claim 6, wherein the first group of people is located in the organization and the second group of people is located in another organization.

8. The method of claim 7, further comprising:
identifying, by the computer system, clusters of the skills from the graph of people; and
identifying, by the computer system, a ranking of the clusters based on the standard, wherein the ranking identifies a fourth cluster in the clusters with a higher level of performance than a fifth cluster in the clusters with respect to the standard.

9. The method of claim 1 further comprising:
identifying, by the computer system, clusters of the skills from the graph of people; and
identifying, by the computer system, a ranking of the clusters based on the standard, wherein the ranking identifies a fourth cluster in the clusters with a higher level of performance than a fifth cluster in the clusters with respect to the standard.

10. The method of claim 1, wherein the third cluster of skills is for a group of the people, and further comprising:
identifying, by the computer system, a number of clusters of skills for a number of groups of people in the graph of people, wherein a plurality of sets of the people includes the group of the people and the number of groups of people;
comparing, by the computer system, the number of clusters of skills to the standard to form a number of comparisons, wherein the comparison and the number of comparisons form a plurality of evaluations;

identifying, by the computer system, a ranking for the plurality of sets of the people based on the plurality of evaluations, wherein the ranking identifies a first group of the people in the plurality of sets of the people with a higher level of performance than a second group of the people in the plurality of sets of the people with respect to the standard; and
determining, by the computer system, that a fourth cluster of skills for the first group of the people is different than a fifth cluster of skills in the second group of the people based on the higher level of performance of the first group of the people compared to the second group of the people in the ranking.

11. The method of claim 1, wherein the difference is based on at least one of amounts of skills, number of employees, numbers of employees of particular types, number of relationships, or types of relationships.

12. An apparatus, comprising:
a display system comprising a display device; and
a computer system comprising a processor in communication with the display system, the processor implementing a skill analyzer that:
identifies a cluster of skills from a graph of people, wherein people of the graph of people comprise an organization, the cluster of skills is a first cluster of skills, the graph of people is a first graph, and a second cluster of skills is a standard, wherein the graph of people includes: nodes for the people, relationships between the people, connectors indicating the relationships between the people, and information about skills of the cluster of skills;
compares the first cluster of skills to the second cluster of skills to form a comparison, wherein in comparing the first cluster of skills to the second cluster of skills, the skill analyzer identifies a difference between the first cluster of skills and the second cluster of skills; and
enables performance of an operation for the organization based on the comparison of the first cluster of skills and the second cluster of skills; and
the display system providing a user interface for the skill analyzer.

13. The apparatus of claim 12, wherein the skill analyzer:
identifies the people in the organization, the relationships between the people, and the skills for the people in the organization; and
creates the nodes for the people and the connectors between the nodes based on the relationships to form the graph of people, wherein the nodes include the information about the skills for the people.

14. The apparatus of claim 12, wherein the skills are identified as ones in which evidence of the skills meets a policy that identifies when the skills are valid.

15. The apparatus of claim 12, wherein the first cluster of skills is for a first group of the people and the second cluster of skills is for a second group of the people, and wherein the first group of the people is located in the organization and the second group of the people is located in another organization.

16. The apparatus of claim 12, wherein the skill analyzer identifies clusters of the skills from the graph of people, and identifies a ranking of the clusters based on the standard, wherein the ranking identifies a third cluster in the clusters with a higher level of performance than a fourth cluster in the clusters with respect to the standard.

17. The apparatus of claim 12, wherein the cluster of skills is for a group of the people, and wherein the skill analyzer:

identifies a number of clusters of the skills for a number of groups of the people in the graph of people, wherein the group of the people and the number of groups of the people form a plurality of sets of the people;

compares the number of clusters of the skills to the standard to form a number of comparisons, wherein the comparison and the number of comparisons form a plurality of evaluations;

identifies a ranking for the plurality of sets of the people based on the plurality of evaluations, wherein the ranking identifies a first group of the people in the plurality of sets of the people with a higher level of performance than a second group of the people in the plurality of sets of the people with respect to the standard; and determine that a third cluster of the skills for the first group of the people is different than a fourth cluster of the skills in the second group of the people based on the higher level of performance for the first group of the people compared to the second group of the people in the ranking.

18. The computer system of claim 17, wherein the operation for the organization is performed.

19. A computer program product, comprising:
a non-transitory, computer readable storage media;
first program code, stored on the computer readable storage media, for identifying a cluster of skills from a graph of people, wherein people of the graph of people comprise an organization, the graph of people includes nodes for the people, connectors indicating relationships between the people, and information about skills of the cluster of skills; and second program code, stored on the computer readable storage media, for comparing the cluster of skills to a standard to form a comparison, wherein the cluster of skills is a first cluster of the skills, the graph of people is a first graph, and the standard is a second cluster of the skills, wherein the second program code further comprises program code for identifying a difference between the first cluster of the skills and the second cluster of the skills to form the comparison, and enabling performance of an operation for the organization based on the comparison of the first cluster of the skills and the second cluster of the skills.

20. The computer program product of claim 19, wherein the skills are identified as ones in which evidence of the skills meets a policy that identifies when the skills are valid.

21. The computer program product of claim 19, wherein the first cluster of the skills is for a first group of the people and the second cluster of the skills is for a second group of the people.

* * * * *